United States Patent Office 3,121,303
Patented Feb. 18, 1964

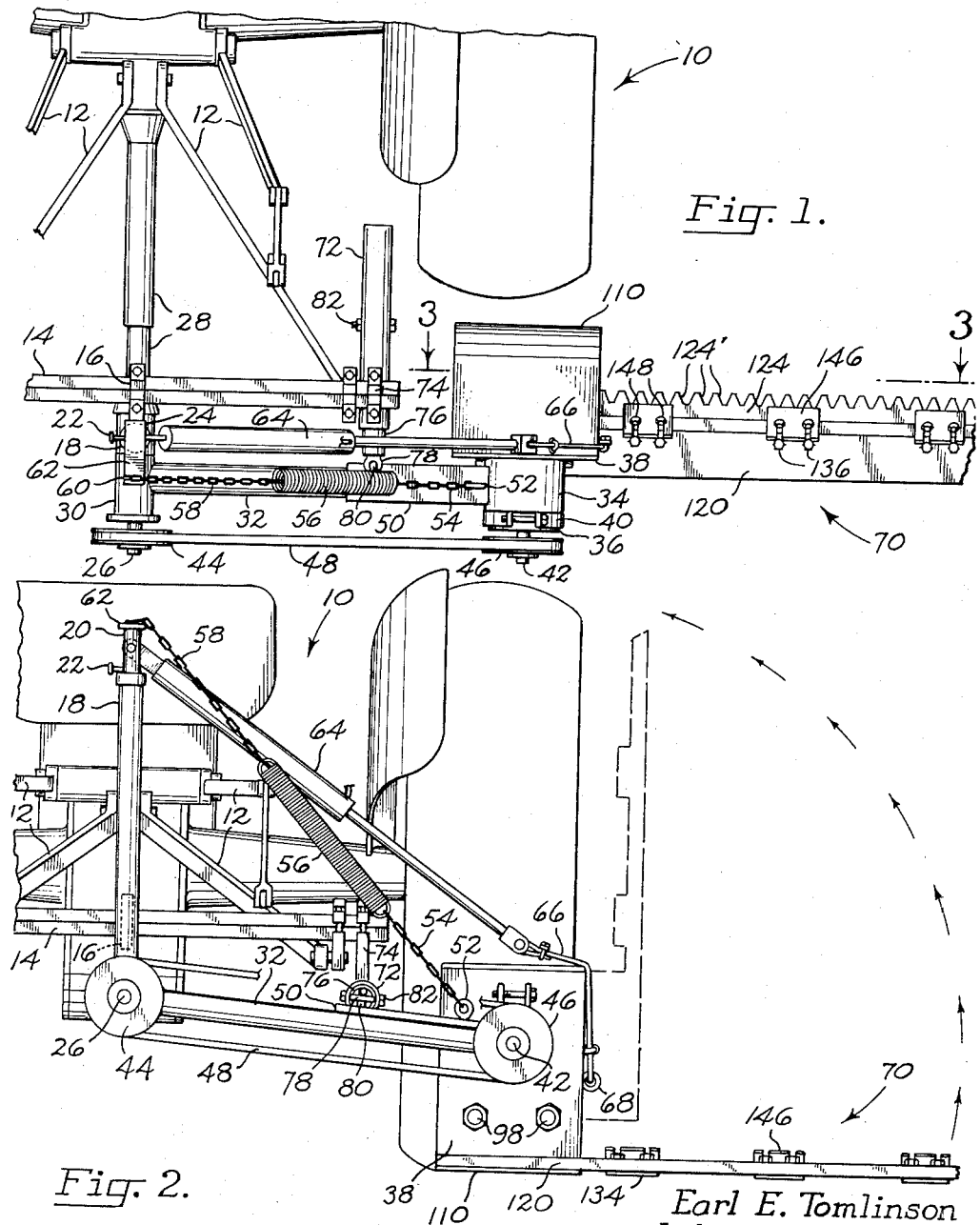

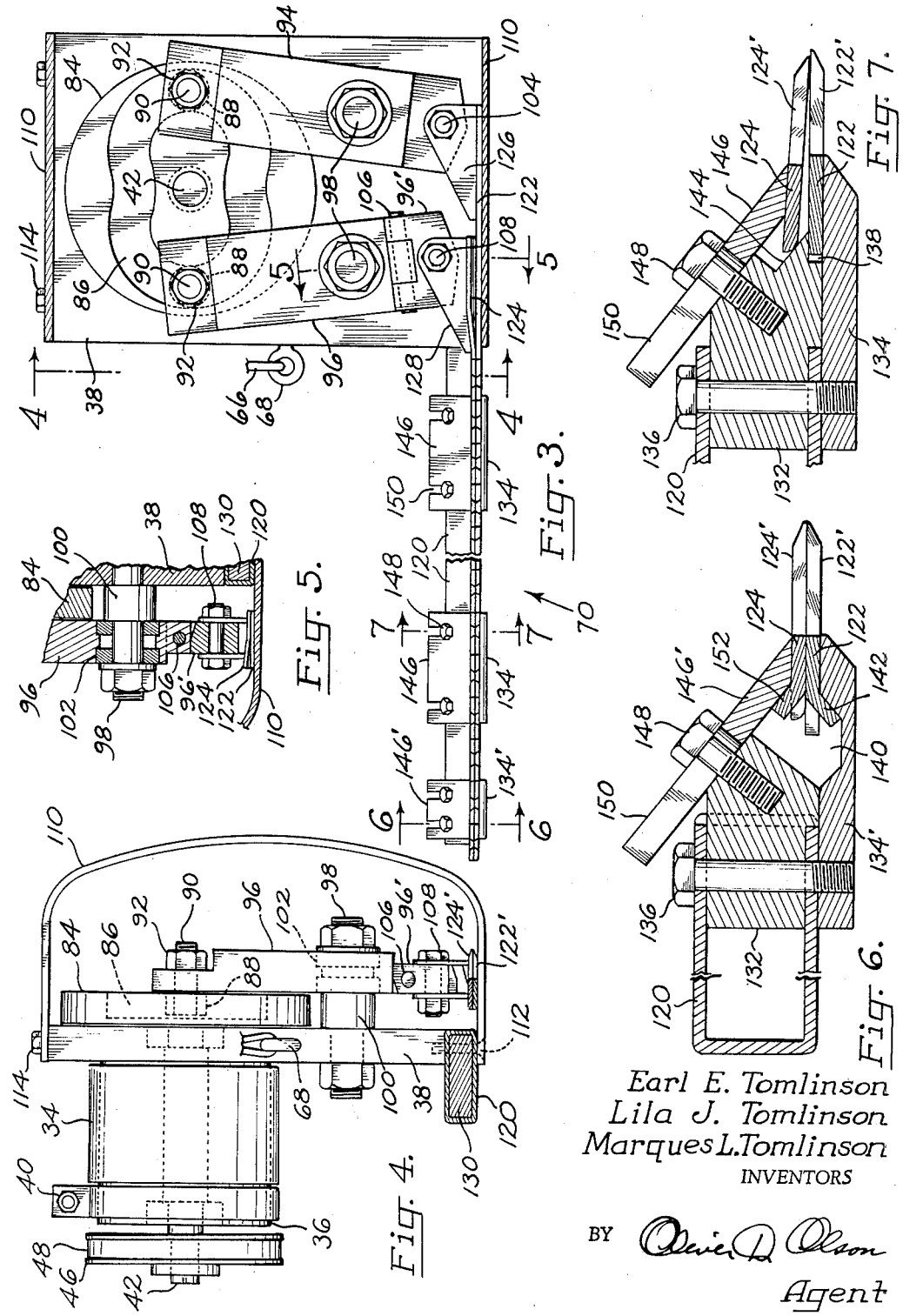

3,121,303
BLADE MOUNTING MEANS FOR A DOUBLE
SICKLE MOWER
Earl E. Tomlinson and Lila J. Tomlinson, both of 11617
NW. 16th Ave., Vancouver, Wash., and Marques L.
Tomlinson, 1310 Quinton, The Dalles, Oreg.
Filed Mar. 16, 1962, Ser. No. 180,113
9 Claims. (Cl. 56—297)

This invention relates to mowers, and more particularly to an improved construction of a mower of the sickle type.

It is the principal object of the present invention to provide a sickle mower which includes the following novel features of construction: It includes a sickle drive mechanism which is of rugged and simplified construction, for economical manufacture and long operating life with minimum maintenance, which provides a multiplied power output, and which is of compact design and minimum size.

The mower is of the double sickle type, and each sickle is provided in the form of a one piece elongated blade having formed therein a plurality of longitudinally spaced cutter teeth, the blades being of such economical construction as to render them expendable after nominal usage.

The aforementioned sickle blades are mounted upon a sickle bar in such manner as to be removable with speed and facility. Moreover, they are mounted upon the sickle bar in such manner as to be adjustable automatically to compensate for wear and to prevent clogging, while simultaneously affording a self sharpening action during use.

The sickle blades and bar assembly is arranged to provide minimum ground clearance for extremely close cutting.

The mower is adapted for attachment to conventional tractors, in either side or rear mount arrangements, with speed and facility. The mounting is such as to accommodate movement of the mower on a vertical axis without impairment of operation.

The foregoing and other objects and advantages of the present invention will appear from the following detailed description, taken in connection with the accompanying drawings in which:

FIG. 1 is a fragmentary plan view of a mower embodying the features of the present invention, the same being shown mounted at the rear of a tractor;

FIG. 2 is a fragmentary rear elevation as viewed from the bottom in FIG. 1, the sickle bar assembly being shown by dash lines in retracted position;

FIG. 3 is an enlarged foreshortened sectional view taken along the line 3—3 in FIG. 1 and showing details of internal construction of the sickle drive assembly;

FIG. 4 is a sectional view taken along the line 4—4 in FIG. 3;

FIG. 5 is a fragmentary sectional view taken along the line 5—5 in FIG. 3;

FIG. 6 is a foreshortened sectional view, on an enlarged scale, taken along the line 6—6 in FIG. 3; and FIG. 7 is a fragmentary sectionary view, on an enlarged scale, taken along the line 7—7 in FIG. 3.

Referring primarily to FIGS. 1 and 2 of the drawings, the mower is shown mounted at the rear of a tractor 10. The conventional assembly of rearwardly extending adjustable lever arms 12 supports the transverse mounting frame 14. Clamp 16 secures the vertically disposed sleeve 18 to the frame 14, and the sleeve may be additionally stabilized by other braces. Extending rotatably through sleeve 18 is support rod 20. An abutment pin 22 extends radially from the rod for engagement with the upper end of sleeve 18, for limiting downward displacement of the rod relative to the sleeve.

Mounted on the lower end of rod 20 is the horizontal bearing 24 for the rotary shaft 26. This shaft is releasably connected at its forward end to the power take-off of the tractor through a conventional telescoping coupling 28 which includes universal joints by which to accommodate a practicable degree of angular displacement between the power take-off and shaft 26.

A sleeve 30 is mounted on the shaft 26, by means of bearings, and one end of an elongated arm 32 extends radially from the sleeve in the lateral direction of the tractor. The opposite end of the arm is secured to a sleeve 34 which is mounted rotatably on the cylindrical hub 36 of the drive unit base 38. A locking collar 40 confines the sleeve 34 on the hub.

A central bore through the hub and base rotatably receives the drive unit input shaft 42. Pulleys 44 and 46 on the shafts 26 and 42, respectively, are interconnected by drive belt 48, whereby to transmit rotary power from the power take-off to shaft 42.

An overlying plate 50 on the arm 32 carries an eyelet 52 which anchors one end of a link chain 54. The opposite end of the chain connects to one end of a heavy coil spring 56, the opposite end of which connects to one end of a second link chain 58. One of the links in the opposite end portion of the second link chain is anchored removably to the projecting upper end of the support rod 20, as by means of the link-receiving slot 60 provided in the plate 62 projecting from the top end of the rod. Thus, the chain and spring assembly functions as an adjustable counterbalance for the weight of the sickle bar assembly and drive unit and to support them adjustably and resiliently at desired pressures upon the ground.

Pivotally connected to the projecting upper end of the rod 20 is one end of an extensible fluid pressure piston-cylinder power unit 64. The opposite end of the extensible unit is attached, through the flexible cable 66, to the eyelet 68 projecting from the outboard side of the sickle power drive base 38. Operation of the power unit 64 effects rotation of the drive base 38 about the axis of shaft 42, to adjust the position of the sickle bar assembly 70 (described hereinafter) between the retracted position shown in dash lines in FIG. 1 and various operative positions substantially parallel to the ground.

The mower assembly is permitted to rotate about the vertical axis of the rod 20, through a limited arc, as might be occasioned when the sickle bar assembly 70 strikes an obstruction on the ground. This degree of rotation generally is sufficient to enable the operator to stop the machine and remove the obstruction. However, in the event of failure of the operator to stop in time, a safety break-away device is provided. In the embodiment illustrated, the device comprises a pair of telescoping tubes, the outer one 72 of which is mounted upon the transverse frame 14 by means of the detachable clamp 74. The rearward end of the inner tube 76 is provided with an eyelet 78 which releasably engages the hook 80 mounted on the plate 50. A shear bolt 82 extends transversely through both telescoping tubes, being confined in axially aligned holes in one of the tubes and passing through longitudinally elongated slots in the other tube. The slots terminate for abutment by the shear bolt when the mower assembly has been rotated on the vertical rod 20 rearwardly to the degree previously explained, and the shear bolt is constructed to shear under a force less than the force which would cause damage to the sickle bar assembly when striking a ground obstruction.

Referring now to FIGS. 3, 4 and 5 of the drawings, the sickle drive shaft 42 extends through the base 38 and mounts on its forward end for rotation therewith the cam track member 84. A substantially elliptical groove 86 is formed in said member, substantially symmetrical with respect to the shaft 42, and this groove receives and guides a pair of diametrically opposed cam rollers 88 carried on the projecting ends of stub shafts 90 secured, as by means of the nuts 92, one to each of the upper ends of a pair of rocker arms 94 and 96. The rocker arms are mounted pivotally intermediate their ends on the bolts 98 supported by the base 38. Enlarged spacer sections 100 of the bolts are interposed between the base and the bearings 102 which mount the rocker arms pivotally on the bolts.

In the cam member construction illustrated, the groove 86 defines inner and outer cam surfaces which confine the cam rollers 88 therebetween. The outer cam surface may be omitted by biasing the rocker arms in such manner as to urge their upper ends toward each other, so that the cam rollers resiliently engage the inner cam surface. Similarly, the inner cam surface may be omitted by appropriately biasing the upper ends of the rocker arms outward so that the cam rollers resiliently engage the outer cam surface.

The lower end of the right hand rocker arm 94 (FIG. 3) carries a pivot bolt 104 for detachably connecting the lower sickle blade thereto, as explained more fully hereinafter. Whereas this lower end is an integral, rigid portion of the rocker arm 94, the lower end section 96' of the left hand rocker arm 96 is a separate extension pivotally connected to the arm by means of the pivot pin 106 for relative rotation on an axis substantially normal to the axis of the rocker arm pivot 98. This pivoted extension carries a pivot bolt 108 which functions to detachably connect to said pivoted extension 96' the inner end of the upper sickle blade, as explained more fully hereinafter.

In the power drive assembly illustrated, the distance between the pivots 90, 98 is substantially twice the distance between the pivots 98, 104 and 98, 108, thus providing a 2:1 power ratio. The pivot bolt 98 for the left hand rocker arm 96 is displaced upwardly with respect to the same pivot bolt for the right hand rocker arm, by substantially the thickness of the upper sickle blade, and the distance between the pivots 90, 98 for the rocker arm 96 is reduced by this amount.

With the drive rollers 88 at the upper ends of the rocker arms, the pivots 98 may be located very close to the sickle pivots 104 and 108, providing maximum power with minimum bearing loading for any desired stroke. The position of the drive unit vertically above the blades facilitates coupling to the tractor power take-off and minimizes the space requirements for the power unit in the transverse direction of the sickle bar assembly.

The forward side of the power drive assembly is protected from the accumulation of dirt, cuttings, etc. by means of the cover 110 which is open at its opposite ends and is supported by the base 38 by means of the attaching bolts 112 and 114.

The elongated sickle bar assembly 70 includes an elongated sickle bar 120 which is supported at its inner end on the lower side of the sickle drive base 38, as by means of the bolts 112. The sickle bars serve to support elongated lower and upper sickle blades 122 and 124, respectively. In the preferred embodiment illustrated, each blade is constructed as a single piece, with a succession of cutter teeth 122' and 124' formed along the forward longitudinal edge of the blades.

The inner end of the lower sickle blade 122 is provided with spaced upstanding tabs 126 which may be formed integral with the blade or otherwise secured to the latter by welding, riveting, etc. Aligned apertures in said tab freely receive the pivot bolt 104 mounted in the lower end of the right hand rocker arm 94. The tabs, and hence the inner end of the lower sickle blade, thus is connected pivotally to the rocker arm 94. The upper sickle blade 124 overlies the lower sickle blade, with the forwardly directed cutter teeth of the two blades arranged for mutual cooperation to perform the cutting operation. The tabs 128 on the inner end of the blade connect the latter to the pivoted lower section 96' of the left hand rocker arm, through the pivot bolt 108.

As illustrated, the sickle bar 120 preferably is formed as a hollow rectangular tube, and the inner end thereof is reinforced by the metal plug 130 for attachment to the drive base 38. At spaced intervals along the length of the hollow sickle bar, portions of the forward side are cut away to provide longitudinally spaced openings in which to removably receive a rearward portion of a plurality of mounting blocks 132 (FIGS. 6 and 7). This rearward portion of each block is thinner than the adjacent forward portion by the thickness of the bottom wall of the sickle bar, so that the underside of the forward portion of the block is substantially coplanar with the under side of the sickle bar. A backing plate 134 abuts this lower surface and projects forwardly of the forward end of the block. Aligned openings in the sickle bar, mounting block and backing plate receive the bolts 136 which secure the assembly together, the openings in the backing plate being tapped for threaded engagement with the bolts.

The forward end portion of each mounting block 132 is cut away longitudinally from the underside to provide a longitudinal groove 138 in which to freely receive the rearward edge portion of the lower sickle blade 122, whereby to confine the latter against vertical displacement between the mounting block and backing plate. The backing plate 134' located adjacent the outer end of the sickle bar is provided with a longitudinal groove 140 to freely receive the downwardly projecting tab segment 142 of the lower sickle blade. This segment is struck from the rear edge portion of the sickle blade adjacent the outer end of the latter, and by its confinement within the groove the blade is retained against forward separation from the bar assembly. Since the inner end of the blade is secured to the lower end of the right hand rocker arm 94, the entire length of the blade is retained in proper position. Accordingly, the intermediate backing plates 134 need not be provided with similar grooves 140, nor do corresponding intermediate portions of the blade need be provided with similar offset segments 142.

The rearward longitudinal edge of the upper blade 124 preferably is rounded, as illustrated in FIGS. 6 and 7, and arranged for abutment against the inclined surface 144 provided at the forward end of those mounting blocks 132 which are not associated with a backing plate provided with groove 140. The upper angular face of the forward end of each mounting block supports a pressure plate 146 which is mounted thereon by means of the bolts 148 which extend through elongated slots 150 in the pressure plate and are anchored in tapped openings in the mounting block. The slots 150 are elongated in the transverse direction of the pressure plate, to permit adjustment of the latter in the direction normal to the longitudinal direction of the sickle blades, as explained more fully hereinafter.

A segment 152 of the upper blade 124 registering with the outermost pressure plate 146' is struck angularly upward to underlie the pressure plate. This upwardly struck segment thus serves to confine the outer end of the upper blade against forward displacement. As in the case of the lower sickle blade, similar offset segments 152 need not be provided intermediate the ends of the upper blade.

In FIG. 6 the assembly illustrates the conditions of adjustment when the sickle blades are new. Thus, the blades are disposed in super-imposed, parallel relation, and the rearward rounded edge of the upper blade 124 rests against the forward end of the inclined surface 144 (FIG. 7) of the mounting block. The pressure plate 146 is adjusted downwardly to press the upper sickle blade firmly against the lower blade. During operation, the resistance exerted by the crop being cut against the forward motion of the mower tends to force the sickle blades rearwardly. However, rearward movement of the upper blade can only be accomplished by simultaneous upward movement of the rearward rounded edge along the inclined surface of the mounting block. Accordingly, the pressure plate is caused to exert still greater force upon the upper blade, thereby pressing the cutter teeth of the upper blade still more firmly toward the cutter teeth on the lower blade. This action insures maximum cutting efficiency under all conditions of crops.

Moreover, as dirt or other debris is forced rearward between the blades, the pressure forcing the blades apart is resisted by the pressure plates, thereby forcing the upper teeth toward the lower teeth.

As the mower continues to be used, the blade contacting end of the pressure bar 146 wears away, as do the contacting surfaces of the upper blade and block. However, readjustment to optimum cutting condition is made automatically as the resistance of the crop forces the blade rearward, up the inclined surface 144 (FIG. 7).

In the event that extended use of the mower results primarily in the wearing of the upper blade in the areas of the underside of the forward portions of the teeth, resulting in clogging, the pressure plates 146 may be readjusted slightly upward to permit the upper blade to move rearwardly and thus ride up the inclined surface 144 at its rearward rounded edge. Under either of the foregoing circumstances, the upper blade thus is disposed at an angle with respect to the lower blade, and pressure plates 146 cause the forward ends of the upper plate teeth to be displaced downward, to intercept the lower teeth and thereby assure optimum cutting relation.

The foregoing angular displacement of the upper blade 124 relative to the lower blade is accommodated without twisting or binding of the blade, by virtue of the pivotal attachment of the lower section 96' of the left hand rocker arm 96 on the pivot pin 106. Further, the adjacent inner end of the upper blade is bent (FIG. 5) in the transverse direction to elevate the forward edge from the lower blade, whereby to permit said pivotal movement without interference with the underlying surface of the lower blade.

The blades illustrated in FIGS. 6 and 7 are shown to be substantially flat throughout their lateral dimensions. If desired, the forwardly toothed portions of the blades may be offset angularly with respect to the rearward body portions of the blades, in the direction toward the opposing teeth, to effect a degree of overlapping of the opposed teeth during reciprocation of the blades. The offset of the teeth may be angular or arcuate, as desired.

The teeth may be resharpened in which case the blades then are reinstalled on the sickle bar assembly in the position of abutment shown in FIG. 6, and the pressure plates 146 are moved forward from the position shown in FIG. 7 to provide the desired pressure on the upper blade.

Removal of the blades for replacement, sharpening, or other repair, is accomplished with speed and facility, simply by disconnection at the pivots 104 and 108. The blades then are moved longitudinally outward a distance sufficient only to release the angularly struck segments 142 and 152 from the associated groove 140 and pressure plate 146', whereupon the blades may be moved laterally forward from between the intermediate pressure plates and backing plates. The inner ends of the blades then may be withdrawn from the adjacent open end of the drive unit cover 110.

The elongated blades, being of one piece construction, are quite inexpensive. Accordingly, in the event of breakage or other damage of a blade, it is more economical to discard it and replace it with a new one. The cost of the blade is no greater than the cost involved in replacing a single tooth of a conventional stickle blade wherein the individual teeth are secured by rivets or other means to a supporting bar.

Since the lower blade is mounted directly upon the flat backing plate, crop cutting at minimum distance above the ground is achieved. For example, if the thickness of the backing plate is three-eighths inch and the lower blade one-eighth inch, cutting is done one-half inch above the ground.

It will be apparent to those skilled in the art that various changes may be made in the structural details described hereinbefore. For example, one of the sickle blades may be mounted in fixed position, with the other blade mounted for longitudinal reciprocative movement relative thereto. The double sickle motion described is preferred, however, for its greater cutting efficiency.

The plurality of longitudinally spaced sickle blade mounting assemblies may be replaced by a single elongated assembly of similar cross sectional design, although the arrangement described is preferred for economy and minimum weight.

Although the locking tabs 142, 152 and groove 140 are shown in the preferred position adjacent the outer end of the sickle bar assembly, it is to be understood that they may be provided at any desired intermediate location outward from the inner ends of the blades which are connected to the rocker arms.

Conventional sickle blades, with individually attached teeth, may be utilized in the sickle bar assembly, although the single piece sickle blades described are preferred for economy and minimum weight. The sickle blades may be powered by other types of drive systems, although the drive system described is preferred for its simplicity, economy of manufacture, ruggedness and minimum size. The 2:1 power ratio of the described drive system may be modified as desired, simply by changing the length of the unit and the relative distances between the pivot connections on the rocker arms.

The foregoing and other changes may be made within the spirit of this invention and the scope of the appended claims.

Having now described our invention and the manner in which it may be used, what we claim as new and desire to secure by Letters Patent is:

1. In a mower, an elongated sickle bar having an inner end mounted adjacent a source of reciprocative power and a forward side arranged to face the direction of mowing, upper and lower elongated sickle blades, sickle blade mounting means on the sickle bar supporting the upper and lower sickle blades for longitudinal reciprocative movement of at least one of the blades, connecting means adjacent the inner end of the movable blade for releasable engagement with the source of reciprocative power, and releasable interengaging means on the movable sickle blade and associated mounting means spaced outwardly from the connecting means and interengaged throughout the length of said reciprocative movement, the interengaging means having a short length relative to the length of the sickle blade and being operable upon release of the connecting means and disengagement of the interengaging means by a short longitudinal movement thereof to permit detaching the sickle blade from the sickle bar by lateral movement thereof.

2. In a mower, an elongated sickle bar having an inner end mounted adjacent a source of reciprocative power and a forward side arranged to face the direction of mowing, upper and lower elongated sickle blades, sickle blade mounting means on the sickle bar supporting the upper and lower sickle blades for longitudinal reciprocative movement of at least one of the blades, the sickle blade mounting means including a mounting block and an underlying backing plate, the block having a forward lower portion spaced above the backing plate to provide a longitudinal confining groove freely receiving a rearward edge portion of the lower sickle blade, the block having a forward surface inclined rearwardly from its lower front edge for engagement by the rearward edge of the upper sickle blade, a pressure plate mounted on the block for engagement with the upper surface of the upper sickle blade, releasable interengaging means adjacent the outer ends of the sickle blades and associated mounting means for limiting the forward displacement of the blades relative to the mounting means, and connecting means adjacent the inner end of the movable blade for releasable engagement with the source of reciprocative power.

3. The combination of claim 2 wherein the releasable interengaging means comprises a projection adjacent the outer end of the lower blade slidably engaging a longitudinal groove in the backing plate, and a projection adjacent the outer end of the upper blade slidably engaging the pressure plate.

4. In a mower, an elongated sickle bar having an inner end mounted adjacent a source of reciprocative power and a forward side arranged to face the direction of mowing, upper and lower elongated sickle blades, sickle blade mounting means on the sickle bar supporting the upper and lower sickle blades for longitudinal reciprocative movement of at least one of the blades, the sickle blade mounting means including a plurality of mounting blocks spaced apart along the length of the sickle bar, an underlying backing plate associated with each block, some of the blocks each having a forward lower portion spaced above the associated backing plates to provide longitudinal confining grooves freely receiving a rearward edge portion of the lower sickle blade, each of said last mentioned blocks having a forward surface inclined rearwardly from the lower front edge for engagement by its rearward edge of the upper sickle blade, a pressure plate mounted on each block for engagement with the upper surface of the upper sickle blade, connecting means adjacent the inner end of the movable blade for releasable engagement with the source of reciprocative power, and releasable interengaging means on the sickle blades and associated mounting means spaced outwardly from the connecting means for limiting the forward displacement of the blades relative to the mounting means.

5. The combination of claim 4 wherein the releasable interengaging means comprises a projection on the lower blade slidably engaging a longitudinal groove in a correspondingly positioned backing plate, and a projection on the upper blade slidably engaging a correspondingly positioned pressure plate.

6. The combination of claim 1 wherein the interengaging means comprises a tab projecting outward from the plane of the blade adjacent the rearward side of the latter for slidable engagement with a corresponding surface of the mounting means.

7. The combination of claim 1 wherein one of the blades is movable rearwardly, and the mounting means includes wedge means slidably engaging the rearward edge of the rearwardly movable sickle blade and arranged upon such rearward movement of the blade to move the forward edge thereof closer to the other blade.

8. For use in a mower having an elongated sickle bar supporting sickle blade mounting means for slidably mounting a sickle blade for longitudinal reciprocative movement relative thereto, an elongated single piece sickle blade having a plurality of teeth along the forward longitudinal edge, connecting means adjacent one end of the blade for releasable engagement with a source of reciprocative power, and a tab projecting angularly outward from the plane of the blade adjacent the rearward side of the latter for slidable engagement with the mounting means for limiting forward displacement of the blade relative to the mounting means, the tab being spaced longitudinally from said one end and having a short length relative to the length of the blade.

9. In a mower, an elongated sickle bar having an inner end mounted adjacent a source of reciprocative power and a forward side arranged to face the direction of mowing, upper and lower elongated sickle blades, sickle blade mounting means on the sickle bar supporting the upper and lower sickle blades for longitudinal reciprocative movement of at least one of the blades, connecting means adjacent the inner end of the movable blade for releasable engagement with the source of reciprocative power, the mounting means supporting one of the sickle blades for rearward movement relative to the other blade, and wedge means on the mounting means slidably engaging the rearward edge of said rearwardly movable sickle blade and arranged upon rearward movement of said blade to move the forward edge thereof closer to the other blade.

References Cited in the file of this patent

UNITED STATES PATENTS

| | | |
|---|---|---|
| 357,330 | Thomas | Feb. 8, 1887 |
| 1,353,450 | Brown | Sept. 21, 1920 |
| 2,403,365 | Hilblom | July 2, 1946 |
| 2,722,798 | Spedding et al. | Nov. 8, 1955 |
| 2,769,296 | Carlson et al. | Nov. 6, 1956 |
| 2,787,111 | Templeton | Apr. 2, 1957 |
| 3,010,268 | Freeman | Nov. 28, 1961 |